US008655010B2

(12) United States Patent
Finn et al.

(10) Patent No.: US 8,655,010 B2
(45) Date of Patent: Feb. 18, 2014

(54) VIDEO-BASED SYSTEM AND METHOD FOR FIRE DETECTION

(75) Inventors: Alan Matthew Finn, Hebron, CT (US); Pei-Yuan Peng, Ellington, CT (US); Rodrigo E. Caballero, Middletown, CT (US); Ziyou Xiong, Wethersfield, CT (US); Hongcheng Wang, Vernon, CT (US)

(73) Assignee: UTC Fire & Security Corporation, Farmington, CT (US)

( * ) Notice: Subject to any disclaimer, the term of this patent is extended or adjusted under 35 U.S.C. 154(b) by 548 days.

(21) Appl. No.: 13/000,698

(22) PCT Filed: Jun. 23, 2008

(86) PCT No.: PCT/US2008/007792

§ 371 (c)(1), (2), (4) Date: Dec. 22, 2010

(87) PCT Pub. No.: WO2009/157889

PCT Pub. Date: Dec. 30, 2009

(65) Prior Publication Data

US 2011/0103641 A1 May 5, 2011

(51) Int. Cl.
*G06K 9/00* (2006.01)

(52) U.S. Cl.
USPC .......... 382/100; 382/103

(58) Field of Classification Search
None
See application file for complete search history.

(56) References Cited

U.S. PATENT DOCUMENTS

| | | | | |
|---|---|---|---|---|
| 6,184,792 | B1 * | 2/2001 | Privalov et al. | 340/578 |
| 6,542,075 | B2 | 4/2003 | Barker et al. | |
| 2002/0104094 | A1 | 8/2002 | Alexander et al. | |
| 2003/0141980 | A1 | 7/2003 | Moore et al. | |
| 2003/0214583 | A1 | 11/2003 | Sakok | |
| 2005/0190263 | A1 | 9/2005 | Monroe et al. | |
| 2005/0271247 | A1 * | 12/2005 | Privalov | 382/100 |

OTHER PUBLICATIONS

Offical Search Report and Written Opinion of the Patent Cooperation Treaty Office in foreign counterpart Application No. PT/US08/07792, filed Jun. 23, 2008.

* cited by examiner

*Primary Examiner* — Claire X Wang
(74) *Attorney, Agent, or Firm* — Cantor Colburn LLP

(57) ABSTRACT

A video recognition system detects the presence of fire based on video data provided by one or more video detectors, but suppresses the triggering of an alarm in situations based on the selection of acceptable regions and application of rules associated with each acceptable region. A user defines acceptable regions within the field of view of the video detector and associates with each acceptable region a rule. During processing of video data associated with the field of view, video metrics are calculated and analyzed to detect the presence of fire (e.g., flame or smoke). Prior to triggering an alarm, regions identified as indicative of fire are compared with the user-defined acceptable regions. If there is overlap between the two regions, the rule associated with the acceptable region is applied to determine whether the alarm should be suppressed or triggered.

20 Claims, 2 Drawing Sheets

VIDEO-BASED SYSTEM AND METHOD FOR FIRE DETECTION

BACKGROUND

The present invention relates generally to computer vision and pattern recognition, and in particular to video analysis for detecting the presence of fire.

The use of video data to detect the presence of fire has become increasingly popular due to the accuracy, response time, and multi-purpose capabilities of video recognition systems. For instance, as opposed to a traditional particle detector, video detectors are capable of detecting the presence of fire prior to actual particles (e.g., smoke) reaching the detector.

In most applications, video-based fire detection systems trigger an alarm in response to the detection of fire (e.g., flame or smoke). However, in some applications the presence of either smoke or flame is expected and should not trigger an alarm. For example, the top of a smokestack emits smoke, detection of which should not result in the triggering of an alarm. Similarly, the top of a vent-stack emits a cloud of steam which may look like smoke and which should not result in the triggering of an alarm. Prior art systems have employed the use of regions of interest (ROI) or masks to either selectively process or ignore certain areas within a video detector's field of view to prevent false alarms such as this. In the smokestack example, a mask may be applied to the region surrounding the smokestack such that a video recognition system does not process or attempt to detect smoke in the masked region.

However, fixed ROIs or masks do not inherently account for the dynamic nature of smoke and flames. In particular, smoke exiting a smokestack may be pushed by ambient winds over a large portion of the field of view of a detector. To avoid false alarms, large areas of the field of view must be masked. Defining the mask or ROI for false alarm reduction, however, may result in missed detections in the large masked areas. A need therefore exists for a video-based fire detection system that can reduce false alarms and missed detections without requiring masking of large portions of the detectors field of view.

SUMMARY

A method of suppressing false alarms associated with video-based methods of fire detection includes defining acceptable regions within the field of view of the video detector and associating rules with each acceptable region. Video data is acquired from a video detector and analyzed to detect regions indicative of fire. If the regions identified as indicative of fire overlap with the acceptable regions, then the rule associated with the acceptable region is applied to determine whether an alarm should be triggered or suppressed.

In another aspect, a video recognition system is employed to detect the presence of fire and determine whether or not to trigger an alarm. The system includes a frame buffer connected to receive video data. A metric calculator calculates one or more metrics associated with the video data, and a detector determines based on the calculated metrics whether the received video data includes regions indicative of fire. Regions identified as indicative of fire are compared with user-defined acceptable regions. If the regions overlap, then the rule associated with the acceptable region is applied to determine whether an alarm should be triggered or suppressed.

In another aspect, a method of suppressing false alarms associated with video-based methods of fire detection includes defining acceptable regions within the field of view of the video detector and associating rules with each acceptable region. Video data is acquired from a video detector and analyzed to detect regions indicative of fire. If there is a correlation between the regions identified as indicative of fire and regions associated with the acceptable regions, then the rule associated with the acceptable region is applied to determine whether an alarm should be triggered or suppressed.

DETAILED DESCRIPTION

The present invention is a system that provides for alarm suppression in video-based fire detection systems based on user defined acceptable regions (hereinafter referred to as "ARs") and rules associated with each AR. This is in contrast with prior art systems that employed regions of interest (ROI) or masked regions to selectively process or ignore, respectively, defined regions within a video detector's field of view. In this way, the present invention provides accurate video-based fire detection that prevents missed detections and false alarms. Throughout this description, the term 'fire' is employed to refer broadly to both smoke and flame. Where appropriate, reference is made to particular examples directed towards either smoke or flame. Similarly, the term 'smoke' is employed to refer broadly to both smoke from combustion and to particulate plumes, vapor plumes, or other obscuring phenomena that might be detected as smoke by a video-based fire detection system.

Figure 1:
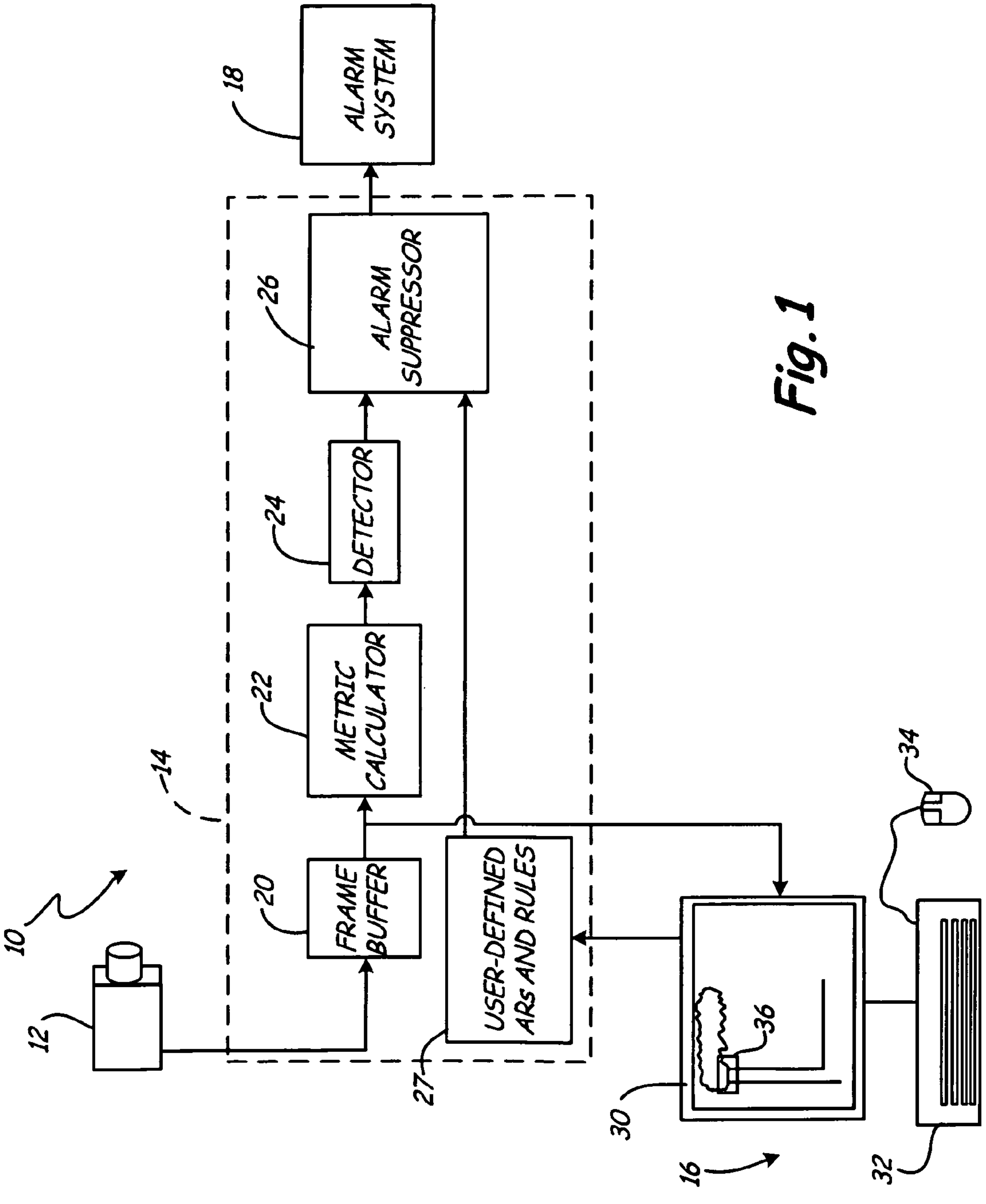
FIG. 1 is a block diagram of a video detector and video recognition system according to an embodiment of the present invention.

FIG. 1 is a block diagram illustrating an exemplary embodiment of a video-based fire detection system 10 according to an embodiment of the present invention. Video-based fire detection system 10 includes video detector 12, video recognition system 14, user interface 16 and alarm system 18. In an exemplary embodiment, video recognition system 14 includes frame buffer 20, metric calculator 22, detector 24, alarm suppressor 26, and rule-based acceptable regions (ARs) 27. In an exemplary embodiment, user interface 16 includes monitor 30, keyboard 32 and mouse 34.

The provision of video by video detector 12 to video recognition system 14 may be by any of a number of means, e.g., by a hardwired connection, over a dedicated wireless network, over a shared wireless network, etc. Video detector 12 may be a video camera or other image data capture device. The term video input is used generally to refer to video data representing two or three spatial dimensions as well as successive frames defining a time dimension. In an exemplary embodiment, video input is defined as video input within the visible spectrum of light. However, the video detector 12 may be broadly or narrowly responsive to radiation in the visible spectrum, the infrared spectrum, the ultraviolet spectrum, or combinations of these broad or narrow spectral frequencies.

Video detector 12 captures a number of successive video images or frames. Video input from video detector 12 is provided to video recognition system 14. In particular, frame buffer 20 temporarily stores a number of individual frames. Frame buffer 20 may retain one frame, every successive frame, a subsampling of successive frames, or may only store a certain number of successive frames for periodic analysis.

Frame buffer 18 may be implemented by any of a number of means including separate hardware or as a designated part of computer memory.

Video images provided to frame buffer 20 are analyzed by metric calculator 22 and detector 24 to identify the presence of flame or smoke. A variety of well-known video-based fire detection metrics (e.g., color, intensity, frequency, etc) and subsequent detector schemes (e.g., neural network, logical rule-based system, support vector-based system, etc.) may be employed to identify the presence of fire within the field of view of video detector 12. Unlike conventional systems in which metric calculator 22 only processes regions not masked or regions identified as ROIs, the present invention processes all regions within the field of view of video detector 12. In other embodiments, the present invention may, in addition, make use of masked regions to limit the field of view processed by metric calculator 22, resulting in a combination of rules-based ARs, masked regions, and ROI defined for a particular application.

Typically, detection of a region indicative of fire results in triggering of the alarm system. In contrast, the present invention compares regions identified as indicative of fire to user-defined ARs 27 to determine whether the alarm should be suppressed or triggered.

For example, if there is overlap between regions identified by detector 24 as being indicative of fire and the ARs defined by a user, then the rule associated with the AR is applied to determine whether alarm system 18 should be triggered. In this example, if there is no overlap between regions identified by detector 24 as being indicative of fire and the ARs defined by a user, then alarm system 18 is triggered based on the output of detector 24.

In other embodiments or examples, rather than merely testing for overlap between regions identified as indicative of fire and user-defined ARs 27, a correlation value is calculated between regions identified as indicative of fire located outside of user-defined ARs 27 and regions identified as indicative of fire within user-defined ARs 27. A detected correlation between the two regions can be used in lieu of overlap to determine whether the rule associated with user-defined AR 27 should be applied.

Acceptable regions can be distinguished from masks in that they do not define regions in which no processing is performed by video recognition system 14 and are not ROIs in that they do not define which regions within the field of view of video detector 12 are processed by video recognition system 14. Rather, each AR defines a region within the field of view of video detection 12 that, for instance, is found to overlap with regions identified as indicative of fire triggers execution of a rule that determines whether alarm system 16 should be triggered.

In the exemplary embodiment illustrated in FIG. 1, a user employs user interface 16 to define ARs as well as the rules associated with each AR. Rules-based ARs 27 are stored and employed by video recognition system 14. User interface 16 may be implemented in a variety of ways, such as by a graphical user interface that allows a user to view and interact with thefield of view of video detector 12. In the exemplary embodiment illustrated in FIG. 1, video data captured by video detector 12 and provided to frame buffer 20 is communicated to user interface 16 and displayed on monitor 30. Keyboard 32 and mouse 34 allow a user to provide input related to the field of view of video detector 12. For instance, in an exemplary embodiment, a user controls mouse 34 to 'draw' AR 36 over a desired portion of the field of view of video detector 12.

Having defined the size and location of the AR with respect to the field of view of video detector 12, the user defines a rule associated with the AR. The rule may be entered by the user with keyboard 32, but as a practical matter, a plurality of available rules would likely be provided to the user by a drop-down menu, wherein the user would select one of the plurality of rules to associate with the defined AR. An exemplary rule may state "if smoke is detected and the region defined as containing smoke is adjacent, but not completely overlapping the indicated acceptable region, then do not raise an alarm." A similar rule may test for the presence of flame, stating "if flame is detected and the region defined as containing flame is adjacent to, but not completely overlapping the indicated acceptable region, then do not raise an alarm." Both the user-defined AR and associated rule selected by the user would be stored to video recognition system 14 for subsequent use in analyzing video data acquired by video recognition system 14.

In another exemplary embodiment, a rule may state "if smoke is detected in a region not overlapping an acceptable region and the smoke is correlated with smoke detected within the acceptable region, then do not raise an alarm." In this case, user selectable parameters would define correlation thresholds for deciding if the spatial, temporal, or spatio-temporal correlation was sufficient to deem the images or video in the two regions as correlated. In this exemplary embodiment, the well-known normalized cross-correlation function is used. However, any of a number of well known correlation computations could also be used to similar effect. A similar rule may test for the presence of flame, stating "if flame is detected in a region not overlapping an acceptable region and the flame is correlated with flame detected within the acceptable region, then do not raise an alarm." This exemplary rule is particularly useful in reducing false alarms from reflected flames in petrochemical, oil, and gas facilities.

Although these exemplary embodiments are taught with respect to a single video detector, it will be clear to one of ordinary skill in the art that many video systems contain multiple video detectors and that rules may be associated with detection regions on one camera's field of view and ARs on another camera's field of view.

Alarm suppressor 26 receives regions identified as indicative of fire from detector 24. This may include regions identified specifically as containing smoke, regions identified as containing flame, or may indicate the presence of both. Alarm suppressor 26 compares the regions identified as indicative of fire with the user-defined ARs to determine if there is overlap. For example, this may include comparing pixel locations associated with regions identified as indicative of fire and user-defined ARs. If there is overlap between the regions, then alarm suppressor 26 applies the rule associated with the user-defined AR to determine whether or not the alarm should be triggered or suppressed. For instance, applying the first exemplary rule defined above, having determined that a region indicative of smoke is adjacent to the user-defined AR, alarm suppressor 26 determines whether the region identified as indicative of smoke completely overlaps the AR. If the region identified as indicative of smoke does not completely overlap the AR, then the alarm is suppressed, otherwise the alarm is triggered. Once again, this may include a pixel-by-pixel analysis to determine whether or not the AR is completely overlapped.

Alarm system 18 is therefore triggered based on the decision and output provided by alarm suppressor 26. In an exemplary embodiment, alarm system 18 is triggered automatically based on the output provided by alarm suppressor 26. In other embodiments, alarm system 18 includes a human operator that is notified of the detected presence of a fire, wherein the human operator is asked to review and verify the presence of fire before the alarm is triggered.

Figure 2A:
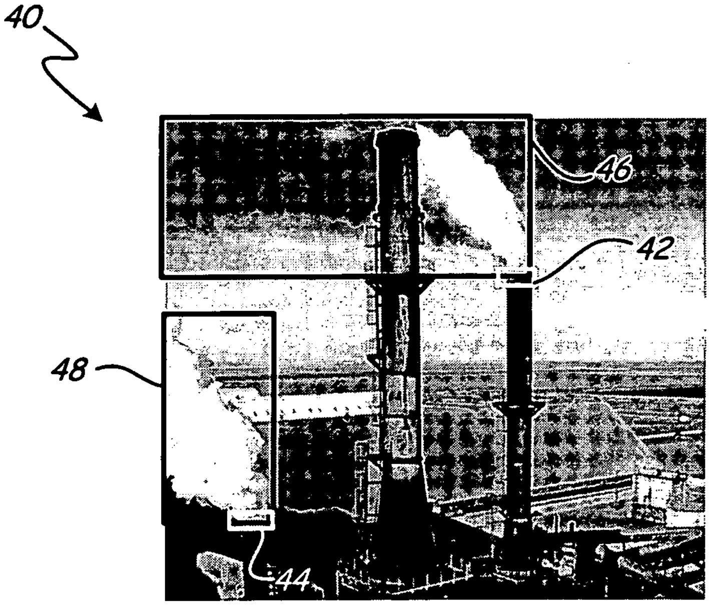
FIGS. 2A and 2B are video images analyzed by the video recognition system according to an embodiment of the present invention.
Figure 2B:
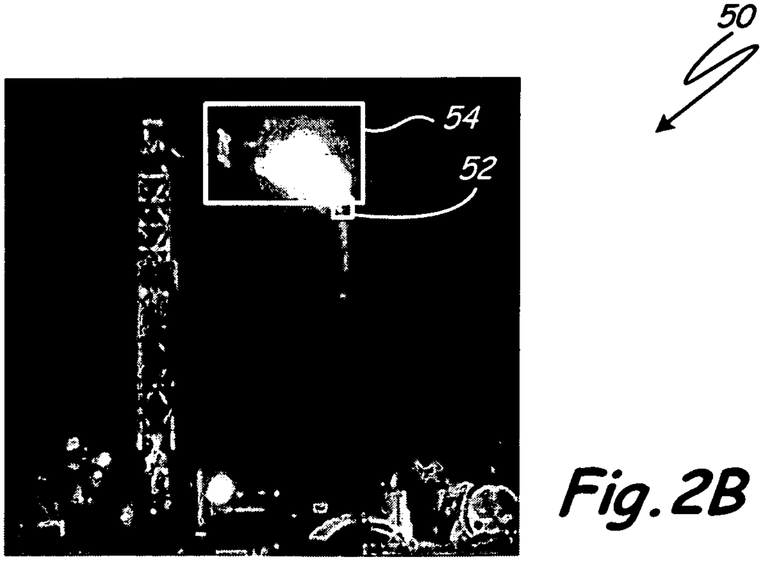

FIGS. 2A and 2B illustrate analysis of video frames provided by a video detector. FIG. 2A illustrates an image acquired by a video detector (e.g., video detector 12 shown in FIG. 1) that includes a plurality of smokestacks with plumes of smoke exiting from the top of each smoke stack. To suppress the presence of false alarms, a user defines within the field of view of the video detector a pair of ARs, 42 and 44, located in the region immediately surrounding each smokestack top. Each AR is further defined by a rule which, when satisfied, will prevent the triggering of false alarms. In this example, the rule is defined as "if smoke is detected and the region defined as containing smoke is adjacent, but not completely overlapping the indicated acceptable region, then do not raise an alarm." In prior art systems employing masking techniques, the entire area surrounding the smokestack and extending from one end (e.g., right side) of the field of view to the other would have to be masked to prevent the presence of smoke triggering an alarm.

Typically, ARs are defined during installation and initialization of the video recognition system (e.g., system 10 shown in FIG. 1). During operation, the video recognition system analyzes all regions included within the field of view of the video detector. In the example shown in FIG. 2A, regions 44 and 46 are identified as containing smoke. Before triggering the alarm system (e.g., alarm system 18 shown in FIG. 1) based on the identified smoke, the regions identified as containing smoke is compared with user-defined ARs 42 and 44. In this example, regions 46 and 48 identified as indicative of smoke overlap with user-defined ARs 42 and 44, respectively. Thus, the rule defined with respect to each user-defined AR is applied to determine whether or not to trigger the alarm system. In this example, region 46 identified as containing smoke is adjacent to AR 42, but does not completely overlap with AR 42. Likewise, region 48 identified as containing smoke is adjacent to AR 44, but does not completely overlap AR 44. As a result, the alarm signal is suppressed.

FIG. 2B illustrates another example in which a video detector (e.g., video detector 12 shown in FIG. 1) monitors a refinery that includes a combustion stack for combusting by-products of a refinery process. Once again, a user defines acceptable regions within the field of view of the detector. In this example, AR 52 is defined in the region immediately surrounding the top of the combustion tower. AR 52 is further defined by a rule which, when satisfied, will act to suppress the triggering of the alarm system. In this example, the rule is defined as "if flame is detected and the region defined as containing flame is adjacent, but not completely overlapping the indicated acceptable region, then do not raise an alarm."

Once again, the video recognition system analyzes all regions included within the field of view of the video detector. In the example shown in FIG. 2B, region 54 is identified as containing flame. Before triggering the alarm system (e.g., alarm system 18 shown in FIG. 1) based on the identified flame, the region identified containing flame is compared with user-defined AR 52 In this example, region 54 identified as indicative of flame overlaps with user-defined AR 52. Thus, the rule defined with respect to each user-defined AR is applied to determine whether or not to trigger the alarm system. In this example, region 54 is adjacent to AR 52, but does not completely overlap with AR 52. As a result, the alarm signal is suppressed.

In this way, the present invention provides a method of monitoring areas for the presence of fire in situations in which smoke or flame may be generated within the field of view of the detector as a normal part of operation. The present invention employs user-defined acceptable regions and rules associated with each region to prevent false alarms without requiring the masking of large portions of the field of view of the video detector, thereby minimizing missed detections as well.

Although the present invention has been described with reference to preferred embodiments, workers skilled in the art will recognize that changes may be made in form and detail without departing from the spirit and scope of the invention.

The invention claimed is:

1. A method of suppressing false alarms associated with video-based fire detection, the method comprising:

defining acceptable regions within a field of view of a video detector;

associating a set of rules with each of the defined acceptable regions;

analyzing video data comprised of one or more frames captured from all regions in the field of view of the video detector;

identifying regions within the field of view of the video detector indicative of fire based on the acquired video data;

detecting overlap between the regions identified as indicative of fire and the defined acceptable regions; and applying the set of rules associated with the acceptable region detected to overlap with the region identified as indicative of fire to determine whether an alarm should be triggered or suppressed, wherein the set of rules comprises a rule to trigger the alarm when no overlap is detected between the regions indicative of fire and the defined acceptable regions.

2. The method of claim 1, wherein a user defines location and size of the acceptable region within the field of view of the video detector.

3. The method of claim 1, wherein identifying regions within the field of view of the detector includes:

calculating video metrics associated with each region within the field of view of the video detector, including the defined acceptable regions.

4. The method of claim 1, wherein the rule associated with the acceptable region dictates that if a region identified as indicative of smoke only partially overlaps the acceptable region then the alarm should be suppressed.

5. The method of claim 1, wherein the rule associated with the acceptable region dictates that if a region that does not overlap the acceptable region is identified as indicative of smoke can be correlated with a region that does overlap the acceptable region that is identified as indicative of smoke, then the alarm should be suppressed.

6. The method of claim 1, wherein the rule associated with the acceptable region dictates that if a region identified as indicative of flame only partially overlaps the acceptable region then the alarm should be suppressed.

7. The method of claim 1, wherein the rule associated with the acceptable region dictates that if a region that does not overlap the acceptable region is identified as indicative of flame can be correlated with a region that does overlap the acceptable region that is identified as indicative of flame, then the alarm should be suppressed.

8. A system for detecting the presence of fire, the system comprising:

a frame buffer operably connectable to receive video data comprised of a plurality of individual frames and to store the received video data;

a calculator that calculates one or more metrics associated with the received video data;

a detector that analyzes all regions within the received video data and determines based on the calculated metrics whether regions within the received video data is indicative of the presence of fire, an acceptable region defined by a user with respect to a field of view defined by the video data, including a set of rules associated with the acceptable region for determining whether to trigger or suppress an alarm based on interaction between the acceptable region and the region identified as indicative of fire, the set of rules comprising a rule to trigger the alarm when no overlap is detected between the regions indicative of fire and the defined acceptable region; and an alarm suppressor that compares the user-defined acceptable region with regions identified as indicative of fire and applies the set of rules defined with respect to the acceptable region to determine whether the alarm should be triggered or suppressed.

9. The system of claim 8, further including:

a graphical user interface displayed to a user that allows a user to define visually with respect to the field of view a location and size of the acceptable regions.

10. The system of claim 9, wherein the graphical user interface includes a drop-down menu that allows a user to select from a plurality of available rules associated with the acceptable region.

11. The system of claim 10, wherein the drop-down menu includes for selection a rule that states that if a region identified as containing smoke is adjacent to, but not completely overlapping the acceptable region, then suppress the alarm.

12. The system of claim 10, wherein the drop-down menu includes for selection a rule that states that if a region that does not overlap the acceptable region is identified as indicative of smoke can be correlated with a region that does overlap the acceptable region that is identified as indicative of smoke, then the alarm should be suppressed.

13. The system of claim 10, wherein the drop-down menu includes for selection a rule that states that if a region identified as containing flame is adjacent to, but not completely overlapping the acceptable region, then suppress the alarm.

14. The system of claim 10, wherein the drop-down menu includes for selection a rule that states that if a region that does not overlap the acceptable region is identified as indicative of flame can be correlated with a region that does overlap the acceptable region that is identified as indicative of flame, then the alarm should be suppressed.

15. A system for detecting the presence of fire, the system comprising:

means for defining acceptable regions within a field of view of a video detector;

means for associating one or more rules with each of the defined acceptable regions;

means for analyzing video data comprised of one or more frames captured from all regions in the field of view of the video detector;

means for identifying regions within the field of view of the video detector indicative of fire based on the acquired video data;

means for detecting overlap between the regions identified as indicative of fire and the defined acceptable regions; and means for applying the rule associated with the acceptable region detected to overlap with the region identified as indicative of fire to determine whether an alarm should be triggered or suppressed, wherein the set of rules comprises a rule to trigger the alarm when no overlap is detected between the regions indicative of fire and the defined acceptable regions.

16. The system of claim 15, wherein the means for defining acceptable regions includes a graphical user interface (GUI) that allows a user to define visually a location and size of the acceptable region within the field of view of the video detector.

17. The system of claim 15, wherein the means for associating one or more rules with each of the defined acceptable regions includes a drop-down menu that provides a plurality of available rules which may be associated with the defined acceptable regions.

18. A method of suppressing false alarms associated with video-based fire detection, the method comprising:

defining acceptable regions within a field of view of a video detector;

associating a set of rules with each of the defined acceptable regions;

analyzing video data comprised of one or more frames from the video detector captured from all regions in the field of view of the video detector;

identifying regions within the field of view of the video detector indicative of fire based on the acquired video data;

detecting a correlation between the regions identified as indicative of fire and the defined acceptable regions; and applying the set of rules associated with the acceptable region detected to correlate with the region identified as indicative of fire to determine whether an alarm should be triggered or suppressed, wherein the set of rules comprises a rule to trigger the alarm when no overlap is detected between the regions indicative of fire and the defined acceptable regions.

19. The method of claim 18, wherein detecting a correlation includes:

calculating a correlation value associated with the region identified as indicative of fire located outside the defined acceptable region and a region identified as indicative of fire located inside the defined acceptable region.

20. The method of claim 19, wherein rule associated with the acceptable region is applied to the region identified as indicative of fire is the calculated correlation value exceeds a user-defined threshold.

* * * * *